United States Patent
Burczyk et al.

(10) Patent No.: US 8,033,178 B2
(45) Date of Patent: Oct. 11, 2011

(54) PRESSURE-MEASURING CELL

(75) Inventors: Dietfried Burczyk, Teltow (DE); Anh Tuan Tham, Berlin (DE); Dieter Stolze, Potsdam (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 184 days.

(21) Appl. No.: 12/086,615

(22) PCT Filed: Dec. 22, 2006

(86) PCT No.: PCT/EP2006/070169
§ 371 (c)(1),
(2), (4) Date: Aug. 10, 2009

(87) PCT Pub. No.: WO2007/077168
PCT Pub. Date: Jul. 12, 2007

(65) Prior Publication Data
US 2009/0293627 A1 Dec. 3, 2009

(30) Foreign Application Priority Data
Dec. 31, 2005 (DE) .......................... 10 2005 063 213

(51) Int. Cl.
*G01L 9/02* (2006.01)
(52) U.S. Cl. ............................................. 73/719; 73/725
(58) Field of Classification Search .................. None
See application file for complete search history.

(56) References Cited

U.S. PATENT DOCUMENTS
2002/0066319 A1  6/2002 Beach

FOREIGN PATENT DOCUMENTS
WO  WO 2004/083110 A2  9/2004

*Primary Examiner* — Andre Allen
(74) *Attorney, Agent, or Firm* — Bacon & Thomas, PLLC

(57) ABSTRACT

A pressure sensor comprises a sensor platform; a measuring membrane, or diaphragm, which is held by the sensor platform, and can have a pressure applied to it and is deformable as a function of pressure; and at least two resistance elements having an $Al_xGa_{1-x}N$ layer. At least a first resistance element of the at least two resistance elements is arranged on the measuring membrane, or diaphragm and has a deformation-dependent resistance value. The pressure sensor can be operated using a measurement circuit to register a signal which depends on the resistance values of the at least two resistance elements in the plane of the $Al_xGa_{1-x}N$ layer. Four resistance elements are preferably provided in a full bridge.

16 Claims, 2 Drawing Sheets

PRESSURE-MEASURING CELL

TECHNICAL FIELD

The present invention relates to a pressure-measuring cell, especially a pressure-measuring cell having at least one deformation-dependent resistance element.

BACKGROUND DISCUSSION

Usually pressure-measuring cells have four deformation-dependent resistance elements in a full bridge circuit, wherein two first resistance elements have a first deformation-dependence and two second resistance elements have a second deformation-dependence. The resistance elements are alternately arranged in a closed bridge circuit, which is fed via a first diagonal, and whose deformation-dependent signal is tapped via the second diagonal of the bridge circuit.

Resistance elements include, for example, piezoresistive, semiconductor resistors, which are produced by local doping in a base material, silicon for example. Insofar as doping is associated with concentration gradients, such resistance elements and/or their deformation-dependence can have a tendency to change, especially at high temperatures, since the concentration gradients are unstable due to diffusion phenomena.

There is thus, in principle, a need for pressure sensors made of other materials, which do not exhibit the mentioned doping-related problems.

Eickhoff et al. have, in the Journal of Applied Physics, Vol. 90, No. 7, described the piezoresistivity of $Al_xGa_{1-x}N$ layers with wurtzite structure and $Al_xGa_{1-x}N/GaN$ heterostructures. In this work, the experimental results are interpreted as regards deformation-dependent resistances supportably with the model of a mechanically controlled gate of a field effect transistor, whose resistance value depends on the deformation-dependent piezoelectric field along the axis perpendicular to the plane of the $Al_xGa_{1-x}N$ layers.

It is to be taken further from this work that an Al concentration between, for example, 0 and 0.35 is suitable as a parameter for the variation of the deformation-dependence of an electrical resistance.

Stutzmann et al. have, in Phys. Stat. Sol. (b) 228, No. 2, 505-512 (2001), described the influence of the polarity of $Al_xGa_{1-x}N$ layers, as a function of terminations with N, respectively Ga or Al, on the electrical characteristics of the layers. It appears, to that extent, interesting to take up the materials described in the above works for implementing a pressure sensor.

SUMMARY OF THE INVENTION

The pressure sensor according to the invention includes:
a sensor platform;
a measuring membrane, or diaphragm, or diaphrgm, which is held by the sensor platform, can have a pressure applied to it and is deformable as a function of pressure; and
at least two resistance elements that have a $Al_xGa_{1-x}N$ layer, wherein at least a first resistance element of the at least two resistance elements is arranged on the measuring membrane, or diaphragm and has a deformation-dependent resistance value.

Preferably, a measuring circuit is provided for registering a signal, which depends on the resistance values of at least two resistance elements in the plane of the $Al_xGa_{1-x}N$ layer.

In a further development of the invention, at least a second resistance element of the at least two resistance elements is arranged on the sensor platform and/or the edge region of the measuring membrane, or diaphragm, so that this resistance element has, in all cases, a negligible deformation dependence.

In a further development of the invention, both the first resistance element as well as the second resistance element of the at least two resistance elements are arranged on the measuring membrane, or diaphragm, wherein the resistance elements experience different changes of their resistance values with a pressure-dependent deformation of the separating membrane, or diaphragm.

For this, the at least one first and the at least one second resistance elements can be arranged in positions having different pressure-dependent deformations, for example at different radii of a circular measuring membrane, or diaphragm.

Alternatively thereto, or in combination therewith, the at least one first and the at least one second resistance elements can have $Al_xGa_{1-x}N$ layers with different Al fractions.

As further alternative for obtaining different resistance changes due to the pressure dependent deformation or as a possible combination with the previously specified measures for this purpose, the at least one first resistance element and the at least one second resistance element can have $Al_xGa_{1-x}N$ layers with opposite polarities due to different terminations of the layers. I.e. the one resistance type has an N terminated layer and the other resistance type has a Ga and/or Al terminated layer.

At present, it is preferred that the pressure sensor has four resistance elements connected in a full bridge, wherein two resistance elements are made of a first type, like the previously described first resistance element, and two resistance elements are of a second type, like the previously described second resistance element. In an advantageous arrangement of the full bridge, the resistance elements have, at the equilibrium position of the separating membrane, or diaphrage, thus without pressure dependent deformation, approximately the same resistance value.

The resistance elements can, for example, be contacted by metal, conductive traces, whose resistance values are negligible in comparison to the resistance of the resistance elements. The resistance elements can, for example, have a length of not more than 1 mm, preferably not more than 0.5 mm, further preferably not more than about 0.25 mm and especially preferably not more than about 0.125 mm. The length refers here to the length of the resistance elements in the direction of current flow. The width of the resistance elements represents a degree of freedom, with which, given material choice and length, the resistance value can be determined, wherein the resistance element is preferably contacted over its entire width by the metallic conductor. Suitable widths can lie, for example, in the range between 0.25 mm and 2 mm, preferably between 0.5 mm and 1 mm.

The layer thickness of the $Al_xGa_{1-x}N$ layer amounts to, for example, not more than 0.2 μm, preferably not more than 0.1 μm, further preferably not more than 0.05 μm, and especially preferably not more than about 0.03 μm.

The $Al_xGa_{1-x}N$ layer can, for example, be applied on a GaN layer of some 100 nm, which is arranged, for its part, on the actual substrate material of the measuring membrane, or diaphragm. As substrate material, silicon, silicon nitride, corundum, or sapphire can, for example, be used, wherein the strength of the substrate material can be selected in accordance with the measuring range of the pressure sensor. For example, silicon membranes, or diaphragms, having a thickness of 5 to 50 μm can be used.

BRIEF DESCRIPTION OF THE DRAWINGS

The invention will now be explained on the basis of the examples of embodiments shown in the drawing, the figures of which show as follows.

DETAILED DISCUSSION IN CONJUNCTION WITH THE DRAWINGS

Figure 1:
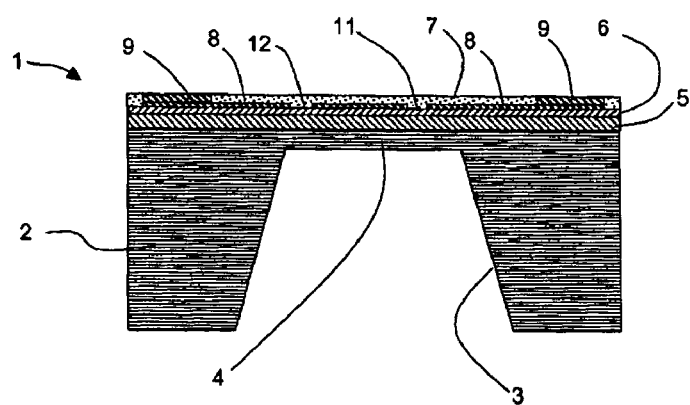
FIG. 1 a schematic, longitudinal section profile through a first example of an embodiment of a pressure sensor of the invention.
Figure 2:
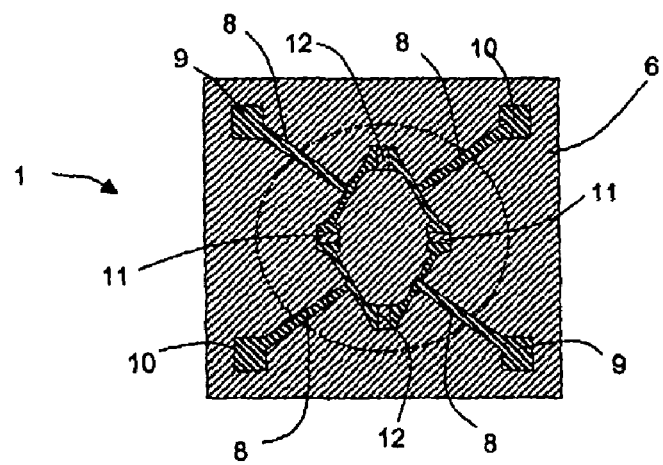
FIG. 2 a plan view of the measuring membrane, or diaphragm, of the first example of an embodiment of a pressure sensor of the invention.

The pressure sensor shown in FIGS. 1 and 2 includes a Si (111) platform 2, in which a cavity 3 is etched, in order to prepare a measuring membrane, or diaphragm, 4 having a thickness of about 5 μm. On the upper side of the platform 2 facing away from the cavity 3, a layer 5 of about 600 nm GaN 5 is applied, on which a $Al_xGa_{1-x}N$ layer 6 of a thickness of about 30 nm is prepared, having an Al:Ga ratio of about 1:4. This layer has a deformation-dependent resistance. In this layer, the four resistance elements 11 and 12 of a full bridge are realized, by placing thereon metal, conductive traces 8 having a higher conductivity than the $Al_xGa_{1-x}N$ layer, and having defined gaps, in which the current flow takes place through the $Al_xGa_{1-x}N$ layer. As a result, the resistance elements 11 and 12 lie beneath these gaps. As shown in FIG. 2, the resistance elements are arranged pairwise at different radii of the measurement membrane, or diaphragm, in order to achieve different pressure dependent resistance changes. The full bridge is fed via contact points 9, and the pressure dependent signal is tapped diagonally to that at contact points 10.

Except for the contact points, the surface of the measuring membrane, or diaphragm 4 is provided with a passivating layer 7, for example of $SiO_2$, in a thickness of about 150 nm.

Figure 3:
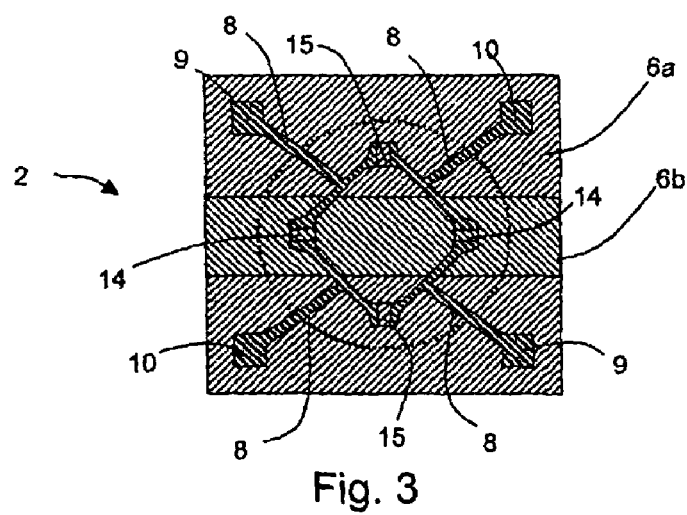
FIG. 3 a plan view of the measuring membrane, or diaphragm, of a second example of an embodiment of a pressure sensor of the invention.

The second example of an embodiment, shown in FIG. 3, includes a measuring membrane, or diaphragm, having, in principle, the same layer structure as with the first example of an embodiment, however the $Al_xGa_{1-x}N$ layer exhibits a lateral heterostructure, so that the resistance elements 14 and 15 can be arranged at the same radial positions of the measuring membrane, or diaphragm, and, nevertheless, exhibit different pressure-dependent changes of resistance.

For achieving the lateral heterostructure, for example, alternating strips 6a and 6b can be prepared with different aluminum content, or strips of N-terminated layers can be arranged alongside strips of Ga-terminated layers.

To prepare the layered structure, usual methods of semiconductor process technology are used. Concerning further details for preparation, reference is made to the literature cited in the introduction.

Besides the described type of contact, an insulator layer can be applied initially in the case of all embodiments over the layer with the resistance elements, into which contact windows are then etched in. The dimensioning and/or bounding of the resistances in the longitudinal direction, thus in the direction of electrical current flow, takes place via the contact holes. Subsequently, a vapor deposition is carried out with a metal, for example, aluminum. The structuring of the metal layer takes place lithographically afterwards. The resistance elements and/or their contact zones are thus contacted from above in the area of the contact hole by the metal, conductive traces.

The invention claimed is:

1. A pressure sensor, comprising:
   a sensor platform;
   a measuring membrane, or diaphragm, which is held by said sensor platform, and is loadable with a pressure and is pressure-dependently deformable; and
   at least two resistance elements having an $Al_xGa_{1-x}N$ layer, with at least a first resistance element of said at least two resistance elements being arranged on said measuring membrane, or diaphragm and having a deformation-dependent resistance value.

2. The pressure sensor as claimed in claim 1, wherein:
   at least a second resistance element of said at least two resistance elements is arranged on said sensor platform and/or a boundary region of said measuring membrane, or diaphragm, so that said at least one second resistance element has an essentially negligible deformation dependence.

3. The pressure sensor as claimed in claim 1, wherein:
   said at least one first resistance element and said at least one second resistance element are arranged on said measuring membrane, or diaphragm, and said resistance elements experience different changes of resistance values with pressure-dependent deformations of said separating membrane, or diaphragm.

4. The pressure sensor as claimed in claim 3, wherein:
   said at least one first and said at least one second resistance elements are arranged at positions having different pressure dependent deformations.

5. The pressure sensor as claimed in claim 4, wherein:
   said at least one first and said at least one second resistance elements are arranged at different radii of said measurement membrane, or diaphragm.

6. The pressure sensor as claimed in claim 1, wherein:
   said at least one first and said at least one second resistance elements have $Al_xGa_{1-x}N$ layers with different amounts of Al.

7. The pressure sensor as claimed in claim 1, wherein:
   said at least one first resistance element and said at least one second resistance element have $Al_xGa_{1-x}N$ layers with opposite polarities due to different terminations of the layers, i.e., one resistance type has an N-terminated layer and another resistance type has a Ga- and/or Al-terminated layer.

8. The pressure sensor as claimed in claim 1, comprising:
   four resistance elements connected in a full bridge, wherein two resistance elements are provided with a first pressure dependence of resistance value and two resistance elements with a second pressure dependence of resistance value.

9. The pressure sensor as claimed in claim 8, wherein:
   said resistance elements have about equal resistance values at the equilibrium position of said separating membrane, or diaphragm, thus without pressure-dependent deformation.

10. The pressure sensor as claimed in claim 1, wherein:
    said resistance elements are contacted by metal, conductive traces.

11. The pressure sensor as claimed in claim 1, wherein:
    said resistance elements have a length of no more than 1 mm preferably not more than 0.5 mm, further preferably not more than approximately 0.25 mm and especially preferably not more than approximately 0.125 mm.

12. The pressure sensor as claimed in claim 1, wherein: widths of said resistance elements lie in the range between 0.25 mm and 2 mm, preferably between 0.5 and 1 mm.

13. The pressure sensor as claimed in claim 1, wherein: layer thickness of said $Al_xGa_{1-x}N$ layer amounts to not more than 0.2 μm, preferably not more than 0.1 μm, further preferably not more than 0.05 μm, and especially preferably not more than approximately 0.03 μm.

14. The pressure sensor as claimed in claim 1, wherein: said $Al_xGa_{1-x}N$ layer is applied on a GaN layer of some 100 nm, which on its part is applied on actual substrate material of said measuring membrane, or diaphragm.

15. The pressure sensor as claimed in claim 1, wherein: said measuring membrane, or diaphragm, comprises silicon, silicon nitride, corundum or sapphire.

16. The pressure sensor as claimed in claim 1, further comprising:
a measuring circuit to register a signal, which depends on resistance values of said at least two resistance elements in the plane of said $Al_xGa_{1-x}N$ layer.

* * * * *